United States Patent [19]

Nolan et al.

[11] Patent Number: 4,630,799
[45] Date of Patent: Dec. 23, 1986

[54] REMOTELY CONTROLLED OVERRIDE VALVE WITH CALIBRATION MEANS

[76] Inventors: John H. Nolan, 803 Voxpoint Cir., Delray Beach, Fla. 33444; William A. Nolan, 3010 NE. 46th St., Lighthouse Point, Fla. 33064

[21] Appl. No.: 619,571

[22] Filed: Jun. 11, 1984

Related U.S. Application Data

[63] Continuation-in-part of Ser. No. 531,848, Sep. 14, 1983, abandoned.

[51] Int. Cl.$^4$ ............................................. F16K 31/02
[52] U.S. Cl. ................................. 251/129.18; 251/65; 251/129.21; 137/460; 137/498; 137/517
[58] Field of Search .................. 137/460, 462; 251/65, 251/129, 130, 141

[56] References Cited

U.S. PATENT DOCUMENTS

| | | | |
|---|---|---|---|
| 2,569,316 | 9/1951 | Jerman | 251/65 X |
| 2,882,921 | 4/1959 | Webber | 251/130 X |
| 3,200,214 | 8/1965 | Aubert | 251/65 X |
| 3,360,007 | 12/1967 | Haidek | 251/65 X |
| 3,683,957 | 8/1972 | Sands | 137/462 X |
| 4,071,042 | 1/1978 | Lombard | 251/129 X |
| 4,210,174 | 7/1980 | Eross | 251/65 X |
| 4,349,042 | 9/1982 | Shimizu | 251/65 X |
| 4,360,038 | 11/1982 | Trinkwalder | 251/65 X |

FOREIGN PATENT DOCUMENTS 0086442 8/1983 European Pat. Off. .............. 251/65

*Primary Examiner*—Harold W. Weakley
*Attorney, Agent, or Firm*—Melvin K. Silverman

[57] ABSTRACT

There is disclosed a fluid control device including housing, a fluid flow passage therein, and a fluid outlet passage communicating with said fluid inlet passage. Within the housing is a reciprocating valve capable of permitting or precluding communication between the inlet and outlet passages, the valve constituting a ferromagnetic armature susceptible to receiving an electromagnetic induction of a magnetic axis along its axis of reciprocation, such a magnetic axis generally corresponding to the longitudinal center of a fluid-tight chamber within said housing within which the valve may reciprocate. The valve is provided with a flow-responsive first radial end face disposed within a region of communication between the inlet and outlet passages. A fluid control device also includes a magnetic stator wound about the housing in the region of the reciprocating valve when the valve is in its open position. The stator, upon receipt of a current, is capable of electromagnetic co-action with the armature valve to thereby reciprocate said valve selectively out of or into closure across the region of communication between the inlet and outlet passages. The closure or non-closure of the reciprocating valve is dependent upon the direction of current flow through the windings of the stator. Thusly, the electromagnetic co-action between the armature valve and the stator may be used to selectively override an otherwise "open" or "closed" position of the reciprocating valve across the region of fluid communication between the inlet and outlet passages.

2 Claims, 4 Drawing Figures

REMOTELY CONTROLLED OVERRIDE VALVE WITH CALIBRATION MEANS

REFERENCE TO RELATED APPLICATION

This application is a continuation-in-part of Ser. No. 531,848, filed Sept. 14, 1983, entitled, "Magnetic Valve With Re-set Mechanism", now abandoned.

BACKGROUND OF THE INVENTION

This invention relates to fluid control devices and, more particularly, to devices responsive to changes in fluid pressure, flow, or rate of flow, and is adapted, among other usages, for shutting-off fluid flow, turning-on fluid flow, or overriding a normally on or normally off position of an actuating armature of a fluid control device.

The prior art in the instant area is represented by such patents as U.S. Pat. No. 3,200,214 to Aubert; U.S. Pat. No. 3,762,683 to Sangel; and U.S. Pat. No. Re. 30,110 to Huebsch.

The present invention is believed to be properly classified in Class 251, Subclass 139, as well as Class 137, Subclasses 498 and 517.

The present invention more particularly relates to the use of a solenoid override of a ferromagnetic valve to alter a normally open or normally closed position of such armature. This override feature is of importance in attaining certain safety features and, as well, in attaining remote override of in-line operating parameters of valving systems, responsive to the appearance of abnormal or undersirable system conditions.

SUMMARY OF THE INVENTION

The present invention constitutes a fluid flow control device including a housing, a fluid inlet passage therein, and a fluid outlet passage having communication with the inlet passage. The fluid control device comprises a reciprocating valve capable of permitting or precluding communication between said inlet and outlet passages, said valve comprising a ferromagnetic armature susceptible to receiving an electromagnetic induction of a magnetic axis along the axis of valve reciprocation, said magnetic axis generally corresponding to the longitudinal center of a fluid-tight chamber within said housing within which said valve may reciprocate, said valve having a flow-responsive first radial end face disposed within a region of communication between said inlet and outlet passages. Further provided is a magnetic stator wound about said housing in the region of the normally open position of said reciprocating valve in which said stator, upon receipt of a current, is capable of electromagnetic co-action with said armature valve to thereby reciprocate said valve selectively out of or into closure across the region of fluid communication between said inlet and outlet passages, such closure or nonclosure, depending upon the direction of current flow through the windings of said stator. Thereby, the electromagnetic co-action of said armature valve and said stator may be used to selectively override an otherwise "open" or "closed" position of said reciprocating armature valve across the region of fluid communication between said inlet and outlet passages.

The stator being electrical element may be remotely operated, either by hard wire or transmitted commands.

Certain embodiments of the invention employ the use of biasing and calibration magnets in order to influence the rate of fluid flow at which closure will normally occur.

It is thereby an object of the present invention to provide a fluid flow control device at which the fluid flow rate causing closure can be carefully calibrated.

A further object is to provide a fluid flow control device of the above type in which the normal point of closure or non-closure of the valve armature can be electrically overridden from a remote location.

A further object is to provide a fluid flow control device of the above character that will have an enhanced re-set reliability.

The above and yet further objects and advantages of the present invention will become apparent from the hereinafter set forth Detailed Description of the Invention, the Drawings, and appended Claims.

BRIEF DESCRIPTION OF THE DRAWINGS

FIG. 1 shows both the open and override modes.

DETAILED DESCRIPTION OF THE INVENTION

Figure 1:
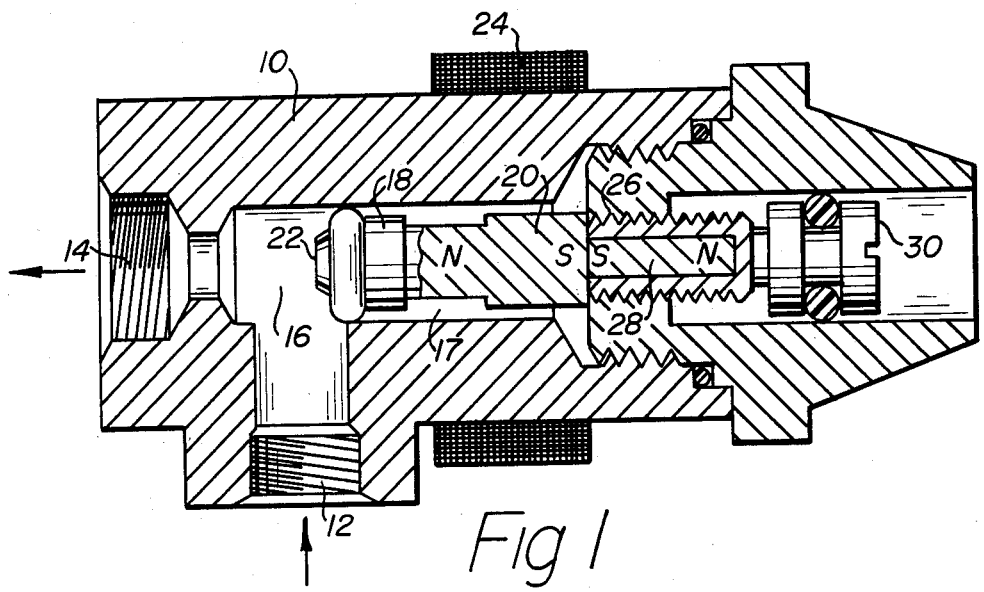
FIG. 1 is an axial cross-sectional schematic view showing the valve armature in open position and showing the use of a calibration magnet having a repulsive mode of polarity with reference to the reciprocating valve armature.

With reference to FIG. 1, there is shown one embodiment of the present inventive fluid flow control device. In all embodiments the present inventive device includes a housing 10, which defines a fluid inlet passage 12 and a fluid outlet passage 14 which communicates with said inlet passage 12 at a region 16 of communication between said inlet and outlet passages.

There is also provided a fluid-tight chamber 17 within said housing 10 in which is housed a reciprocating valve 18, capable of permitting or precluding communication across said region 16 between the inlet and outlet passages 12 and 14 respectively. The valve 18 comprises a ferromagnetic armature susceptible of receiving an electromagnetic induction of a magnetic axis 20 along its axis of reciprocation within passage 17. Said magnetic axis 20 generally corresponds to the longitudinal axis of said fluid-tight chamber 17. Said valve 18 also includes a flow-responsive first radial end face 22 which is located within the region 16 of communication between the inlet and outlet passages. Therefore, the end face 22 is exposed to the fluid flow passing through region 16.

Figure 2:
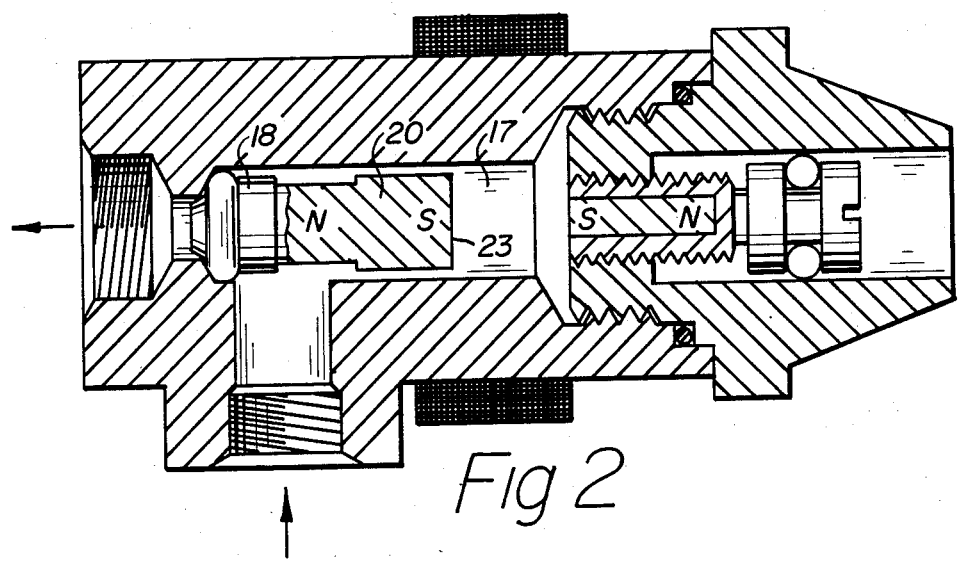
FIG. 2 is an axial cross-sectional schematic view, similar to view of FIG. 2 however showing the reciprocating armature valve in closed position and the selenoid is not actuated.

A magnetic stator 24, consisting of a multiplicity of windings, is wound about said housing 10 in the region occupied by the reciprocating valve 18 when said valve is in its open position. Said stator, upon the receipt of current, will electromagnetically co-act with said armature valve 18 in order to urge said valve in a direction determined by the polar direction of current flow through the windings of the stator 24. For example, the application of current through the windings of stator 24 in a counterclockwise direction with reference to the direction of fluid flow out of passage 14 will cause the armature valve 22 to be retained in the open position shown in FIG. 1 notwithstanding the presence of a fluid flow rate sufficient to normally close the armature valve, this being the condition shown in FIG. 2.

If it is desirable to maintain the armature valve in a closed position, notwithstanding the position of said valve normally dictated by the level of fluid flow, current would be applied to the stator 24 in a direction clockwise with reference to the direction of a flow through the passage outlet 14.

In that the stator 24 is an electrical element, its actuation may be controlled remotely from the valve location in order to, thereby, attain certain safety advantages. For example, it will sometimes be desirable to close the valve, regardless of the level of fluid flow therein. Conversely, in certain systems applications, it will be desirable to maintain the valve in an open position regardless of the level of fluid flow across the region 16. Accordingly, the electromagnetic co-action of the armature valve and the stator may be used to selectively override an otherwise normally open or closed position of the reciprocating armature valve 18.

In addition to the generic override function of the present invention, the fluid control device may be provided with various biasing and calibration means that are useful in establishing the exact fluid flow rate at which closure of the valve 18 into the region 16 will occur. One such bias and calibration means 26 comprises a permanent magnet 28 that is disposed co-linearly and distal-proximately to said reciprocating valve 18, near a radial end 23 of the valve opposite to the flow-responsive end 22 of said valve 18. A permanent magent 28 may be provided with a polarity that will either repel or attract the reciprocating valve 18. Where repulsion occurs (as in the embodiments of FIGS. 1 and 2), the level of fluid actuation of valve 18 is lowered. Conversely, where the magnetic polarity of axis 21 is attractive with respect to the polarity of reciprocating valve 18 (as in the embodiments of FIGS. 3 and 4), the level of fluid flow actuation of valve 18 is increased.

Additional calibration of means 26 is possible through the use of screw 30 in order to modify or change the distance between axis 20 (or 21) and magnet 28. As the distance between the magnets is increased, the attractive or repulsive force, as the case may be, will of course decline. Accordingly, through the rotation of screw 30, a fine tuning of the attractive or repulsive relationship between valve 18 and magnet 28 can be attained.

Similarily, the screw 30 may be rotated in the appropriate direction to move to the left, toward region 16, both the magnet 28 and the valve 18. By said movement, the flow-responsive end face 22 of valve 18 will encounter a larger cross-section of fluid flow. This will reduce the level of fluid flow necessary to bring about closure of valve 18.

It is to be appreciated that magnetic axes 20 or 21 may comprise either an electromagnetically induced axis into the ferromagnetic armature of valve 18 or, in the alternative, may comprise a permanent magnet placed within the armature. If a permanent magnet is used, the polarity of such permanent magnet should correspond to the magnetic axis that would naturally be induced into the ferromagnetic material by the flow of electricity through the windings within stator 24.

Figure 3:
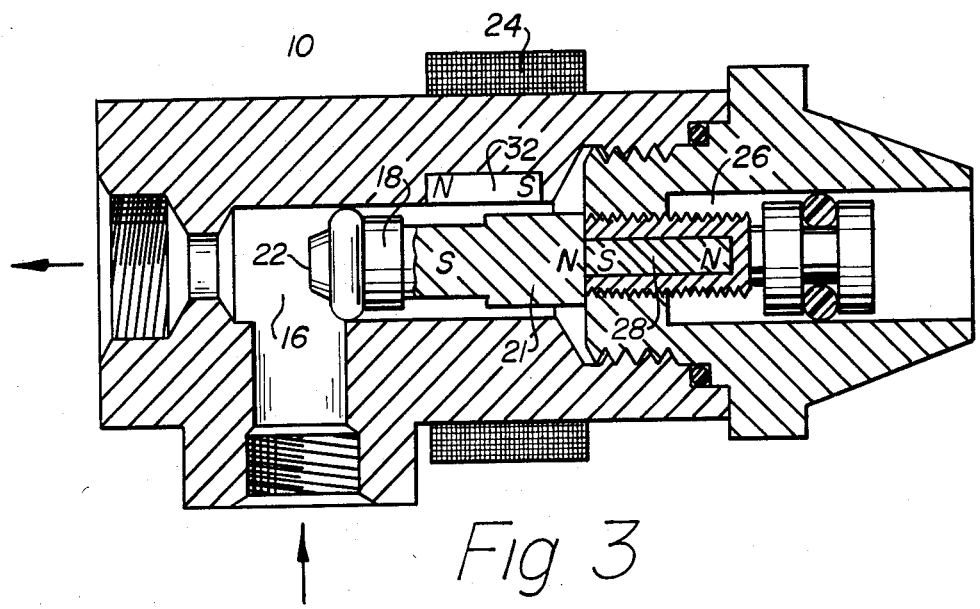
FIG. 3 is an axial cross-sectional schematic view showing the use of a calibration magnetic having an attractive polarity with reference to the reciprocating armature, in which the valve is in a normally open position and the solenoid is not actuated.
Figure 4:
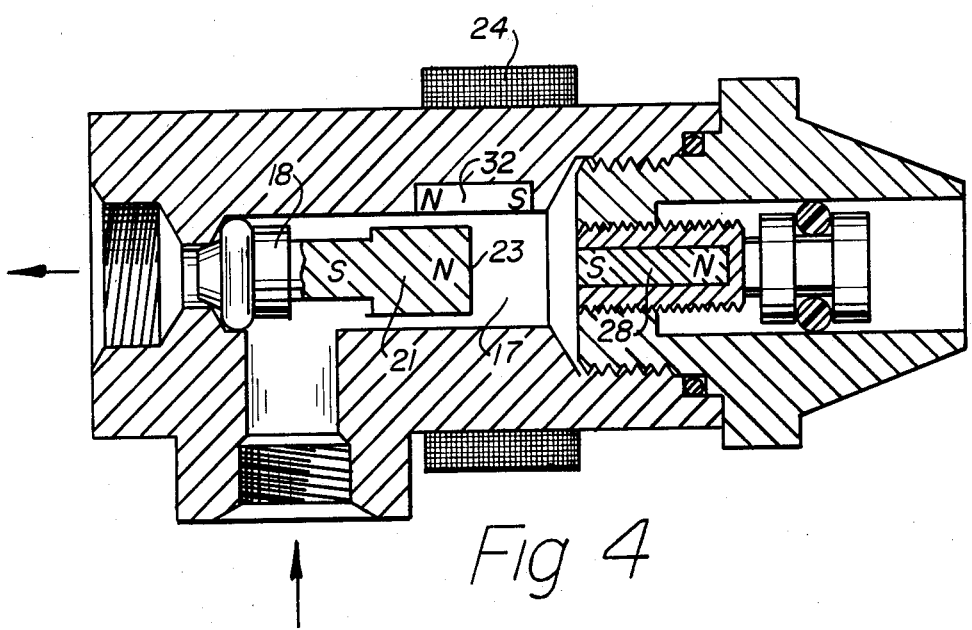
FIG. 4 is an axial cross-sectional schematic view similar to the view of FIG. 3 however showing the reciprocating valve in its normally closed position and, as well, showing a solenoid override into the closed position.

A second type of biasing magnet may also be furnished to the present override valve, and this is shown in FIGS. 3 and 4. More particularly, a permanent magnet 32 may be disposed within the housing 10 at a location that is co-radial with respect to the reciprocating valve when said valve is in its open position. Such a co-radial permanent magnet 32 will influence the point at which valve 18 will close, depending upon the polarity of the magnet 32 and its strength. Also, the polarity of magnet 32 will affect the behavior of valve 18 upon reset, that is, when fluid flow has declined from the level at which closure would normally occur, it is useful to have magnet 32 positioned in a manner that will assist the valve 18 in returning to its open position. This is a schematically shown in FIGS. 3 and 4 in which it may be seen that magnet 32 will, in effect, help to "pull" valve 18 back into its open position when fluid flow has fallen to a level below the actuation point. Also, permanent magnet 28, when provided with a polarity which is attractive with respect to valve 18 will help the valve to stay in a normally open position. In other words, the magnet 32 starts the valve 18 toward a proper reset, and magnet 28 thereafter continues pulling valve 18 until complete reset is accomplished.

In addition, the magnetic stator 24 can be used to accomplish a reset when a problem in the reset function is occurring, or when it is believed that a problem in the reset function might occur. This condition is schematically shown in FIG. 3 which may be viewed as an override reset condition.

While there have been herein shown and described the preferred embodiments of the present invention, it is to be understood that the invention may be embodied otherwise and is herein illustrated and described, and that within said embodiments, certain changes in the detail and construction, and in the form and arrangement of the parts may be made without departing from the underlying idea or principles of this invention within the scope of the appended Claims.

Having thus described our invention, what we claim as new, useful and nonobvious and, accordingly, secure by Letters Patent of the United States is:

1. A fluid control valve including a housing, a fluid inlet passage therein, and a fluid outlet passage in communication with said fluid inlet passage, said fluid control device comprising:
(a) a reciprocating valve capable of permitting, limiting, or precluding communication between said inlet and outlet passages, said valve comprising a ferromagnetic armature susceptable of receiving an electromagnetic induction of a magnetic axis along its axis of reciprocation, said magnetic axis generally corresponding to the longitudinal center of a fluid-tight chamber within said housing within which said valve may reciprocate, said valve having a variable flow-responsive integral first radial end face disposed within a region of communication between said inlet and outlet passages;
(b) a magnetic stator wound about said housing in the region of said reciprocating valve when said valve is in its open or limiting position, said stator, upon receipt of current, being capable of electromagnetic co-action with said armature valve to reciprocate said end face selectively out of or into closure across said region of fluid communication between said inlet and outlet passages, such closure and non-closure being dependent upon the direction of current flow through the windings of said stator; and (c) magnetic bias and calibration means disposed within said housing and disposed co-linearly with and proximate to said reciprocating valve, near a radial end thereof opposite to said flow-responsive radial end of said valve, said bias and calibration means provided with an axis of magnetic polarity substantially co-linear with said magnetic axis of said reciprocating valve, said bias and calibration means further comprising external means for selectably advancing said flow-responsive first radial end face partially into said region of inlet-outlet communication to thereby correspondingly calibrate the level of fluid flow necessary to overcome the magnetic co-action between said bias and calibration means, and said reciprocating valve, to thereby precisely regulate the closure thereof, whereby the electromagnetic co-action of said reciprocating valve and said stator may be used to selectively override and otherwise open or close said reciprocating valve in said region of communication between said inlet and outlet passages and, further whereby, said magnetic bias and calibration means will attract said reciprocating valve when the polarity of the magnetic axis of said bias and calibration means is the same as the polarity of the axis of said reciprocating valve and, conversely, will repel said reciprocating valve when the polarity of the magnetic axis of said calibration means is opposite to that of said reciprocating valve.

2. The device as recited in claim 1, further comprising a permanent magnet set within said housing co-radially to said reciprocating valve when said valve is in its open position, said permanent magnet comprising a second means for biasing said reciprocating valve to influence the fluid flow rate at which closure thereof will occur, said second biasing means also acting to enhance the re-set reliability of said reciprocating valve.

* * * * *